United States Patent
Chen et al.

(10) Patent No.: US 10,440,613 B2
(45) Date of Patent: Oct. 8, 2019

(54) METHODS OF ELECTRONIC COMMUNICATION DEVICE AND NETWORK NODE, ELECTRONIC COMMUNICATION DEVICE, NETWORK NODE, AND COMPUTER PROGRAMS

(71) Applicant: Telefonaktiebolaget L M Ericsson (publ), Stockholm (SE)

(72) Inventors: Maomao Chen, Arlov (SE); Fredrik Nordstrom, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/766,742

(22) PCT Filed: Jul. 30, 2015

(86) PCT No.: PCT/EP2015/067464
§ 371 (c)(1),
(2) Date: Aug. 8, 2015

(87) PCT Pub. No.: WO2017/016605
PCT Pub. Date: Feb. 2, 2017

(65) Prior Publication Data
US 2018/0176828 A1 Jun. 21, 2018

(51) Int. Cl.
*H04W 28/22* (2009.01)
*H04W 28/18* (2009.01)
(Continued)

(52) U.S. Cl.
CPC .......... *H04W 28/22* (2013.01); *H04B 1/0003* (2013.01); *H04B 7/0413* (2013.01);
(Continued)

(58) Field of Classification Search
CPC ......... H04L 47/10; H04L 47/30; H04L 47/11; H04L 47/12; H04L 2012/5631;
(Continued)

(56) References Cited

U.S. PATENT DOCUMENTS

2003/0021243 A1* 1/2003 Hamalainen .......... H04L 1/0009
370/329
2005/0164644 A1* 7/2005 Shinoi .................. H04B 1/7097
455/69
(Continued)

FOREIGN PATENT DOCUMENTS

WO 2006075208 A1 7/2006

OTHER PUBLICATIONS

3GPP TSG-RAN WG4 Meeting #75, R4-152894, Test purpose and test proposals for NAICS CQI reporting, Fukuoka, Japan, May 25th-29th, 2015, 6 pages.
(Continued)

*Primary Examiner* — Brenda H Pham
(74) *Attorney, Agent, or Firm* — Leffler Intellectual Property Law, PLLC (57) ABSTRACT

A method of an electronic communication device is disclosed. The electronic communication device is arranged to operate in a radio communication system, wherein the radio communication system has capability of performing link adaptation by adapting one or more parameters of communication in view of a quality of a radio link between a network node of the radio communication system and the electronic communication device. The method comprises determining a link adaptation status for the electronic communication device, and transmitting information related to the determined link adaptation status to one or more network nodes of the radio communication system. A method of a
(Continued)

network node, an electronic communication device, a network node, and computer programs are also disclosed.

10 Claims, 3 Drawing Sheets

(51) Int. Cl.
| | | |
|---|---|---|
| *H04B 1/00* | (2006.01) | |
| *H04B 7/0413* | (2017.01) | |
| *H04B 7/0417* | (2017.01) | |
| *H04B 7/06* | (2006.01) | |
| *H04L 1/00* | (2006.01) | |
| *H04W 24/02* | (2009.01) | |
| *H04W 28/20* | (2009.01) | |

(52) U.S. Cl.
CPC ......... *H04B 7/0417* (2013.01); *H04B 7/0613* (2013.01); *H04B 7/0632* (2013.01); *H04L 1/0009* (2013.01); *H04W 24/02* (2013.01); *H04W 28/18* (2013.01); *H04W 28/20* (2013.01)

(58) Field of Classification Search
CPC ... H04L 47/15; H04L 47/2441; H04L 1/0009; H04L 47/70; H04W 28/22; H04W 28/18; H04W 24/02; H04W 28/20; H04B 1/0003; H04B 7/0413; H04B 7/0417; H04B 7/0613; H04B 7/0632
USPC .............. 370/229, 230, 235, 232, 236, 252
See application file for complete search history.

(56) References Cited

U.S. PATENT DOCUMENTS

| | | |
|---|---|---|
| 2005/0181811 A1 | 8/2005 | Magnusson et al. |
| 2009/0238086 A1 | 9/2009 | Ringstrom et al. |
| 2012/0039207 A1 | 2/2012 | Eriksson et al. |
| 2013/0064122 A1* | 3/2013 | Hammarwall ........ H04L 1/0034 370/252 |
| 2015/0117321 A1* | 4/2015 | Chen .................... H04L 1/0013 370/329 |

OTHER PUBLICATIONS

LTE; Evolved Universal Terrestrial Radio Access (E-UTRA); User Equipment (UE) radio transmission and reception (3GPP TS 36.101 version 12.7.0 Release 12), ETSI TS 136 101 V12.7.0 (May 2015), 660 pages.

LTE; Evolved Universal Terrestrial Radio Access (E-UTRA); Physical layer procedures (3GPP TS 36.213 version 12.5.0 Release 12) ETSI TS 136 213 V12.5.0 (Apr. 2015), 242 pages.

PCT International Search Report, dated Mar. 22, 2016, in connection with International Application No. PCT/EP2015/067464, all pages.

PCT Written Opinion, dated Mar. 22, 2016, in connection with International Application No. PCT/EP2015/067464, all pages.

Pierre Bertrand et al., Link Adaptation Control in LTE Uplink, Vehicular Technology Conference (VTC Fall), 2012, IEEE, Sep. 3, 2012, pp. 1-5.

* cited by examiner

METHODS OF ELECTRONIC COMMUNICATION DEVICE AND NETWORK NODE, ELECTRONIC COMMUNICATION DEVICE, NETWORK NODE, AND COMPUTER PROGRAMS

TECHNICAL FIELD

The present invention generally relates to methods of an electronic communication device and a network node, such an electronic communication device and such a network node, and computer programs for implementing the methods. In particular, the invention relates to the electronic communication device determining and communicating its link adaptation status, and to the network node acquiring the communicated link adaptation status and adapting link adaptation operations in dependence thereof.

BACKGROUND

In a typical cellular network, also referred to as a wireless communication system, a radio communication system or a communications system, a User Equipment (UE), communicates via a Radio Access Network (RAN) to one or more Core Networks (CNs).

A user equipment is a device that may access services offered by an operator's core network and services outside the operator's network to which the operator's radio access network and core network provide access. The user equipment may be any device, mobile or stationary, enabled to communicate over a radio channel in a communications network, for instance but not limited to e.g. mobile phone, smart phone, tablet computer, sensors, meters, vehicles, household appliances, medical appliances, media players, cameras, Machine to Machine (M2M) device, or any type of consumer electronic, for instance but not limited to television, radio, lighting arrangements, tablet computer, laptop or Personal Computer (PC). The user equipment may be portable, pocket storable, hand held, computer comprised or vehicle mounted mobile devices, enabled to communicate voice and/or data, via the radio access network, with another entity.

The user equipment is enabled to communicate wirelessly in the communications system. The communication may be performed e.g. between two UEs, between a UE and a regular telephone and/or between the UE and a server via the radio access network and possibly one or more core networks, comprised within the communications system.

The radio access network covers a geographical area which is divided into cell areas. Each cell area is served by a base station. In some radio access networks, the base station is also called e.g. Radio Base Station (RBS), evolved NodeB (eNB), NodeB or B node. A cell is a geographical area where radio coverage is provided by the base station at a base station site. Each cell is identified by an identity within the local radio area, which is broadcast in the cell. The base station communicates over an air interface operating on radio frequencies with the user equipment within range of the base station.

A current Channel Quality Indicator (CQI) of the user equipment is provided to the radio access network. This CQI value is then used by the base station to calculate the amount of data that should be sent to the user equipment in the next transmission. The system may recover fast from errors by using Hybrid Automatic Repeat reQuest (HARQ). HARQ is a technique that enables faster recovery from errors in communications systems by storing corrupted packets in the receiving device rather than discarding them. Even if retransmitted packets have errors, a good packet may be derived from the combination of bad ones.

Multiple Input Multiple Output (MIMO) refers to any communications system with multiple antennas at the transmitter and/or the receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and for combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the required minimum number of receiver antennas is equal to the number of separate data streams. 4×4 MIMO, also referred to as four branch MIMO, may support up to four data streams. In general, MIMO may be n×n MIMO, where n is the number of antennas and is positive integer. For example 2×2 MIMO, 8×8 MIMO, 16×16 MIMO etc.

Some terms will now be explained. A transport block holds the data that is going to be transmitted, and the transport block is converted into a codeword. A codeword may be defined as the number of transport blocks which have the same HARQ-process identifier. A codeword may be mapped to a number of layers. The term "layer" is synonymous with "stream." For MIMO, at least two layers are used. The number of layers is always less than or equal to the number of antennas. Precoding modifies the layer signals before transmission. A transmission rank refers to the number of transmitted data streams.

Channel feedback information, also referred to as Channel State Information (CSI), enables a scheduler to decide which user equipments that should be served in parallel. The user equipment is configured to send at least one of the following three types of channel feedback information: a CQI, a Rank Indicator (RI) and a Pre-coding Matrix Indicator (PMI). CQI is an important part of channel information feedback. The CQI provides the base station with information about link adaptation parameters which the user equipment supports at the time. The CQI is utilized to determine the coding rate and modulation alphabet, as well as the number of spatially multiplexed data streams. RI is the user equipment recommendation for the number of layers, i.e. the number of data streams to be used in spatial multiplexing. RI is only reported when the user equipment operates in MIMO mode with spatial multiplexing. The RI may have the values 1 or 2 in a 2×2 MIMO configuration i.e. one or two transmitted data streams. The RI may have the values from 1 and up to 4 in a 4×4 MIMO configuration. The RI is associated with a CQI report. This means that the CQI is calculated assuming a particular RI value. The RI typically varies more slowly than the CQI. PMI provides information about a preferred pre-coding matrix in a codebook based pre-coding. PMI is only reported when the user equipment operates in MIMO mode. The number of pre-coding matrices in the codebook is dependent on the number of antenna ports on the base station. For example, four antenna ports enables up to 64 matrices dependent on the RI and the user equipment capability. The PMI indicates a specific precoding vector that is applied to the transmit signal at the base station.

In a common approach to link adaptation for wireless communications, the transmitter adjusts one or more transmission parameters responsive to changes in the receiver's channel quality. The receiver supports link adaptation by the transmitter by sending channel quality information as feedback to the transmitter. For example, the receiver periodically or aperiodically measures channel quality and sends corresponding CQIs to the transmitter, which uses the reported CQIs to adjust the modulation and coding scheme used for transmitting to the receiver.

Ongoing signal quality measurements at the receiver drive CQI generation and feedback. For example, the receiver periodically or aperiodically measures received signal quality as a signal-to-noise ratio (SNR), and maps the measured SNRs into a defined table of CQI values, each value representing a range of SNRs in dBs. CQI may be expressed in terms of transport format sizes which approximately follow an SNR dB scale. Here, the receiver estimates the largest transport format that can be received at a defined reliability or other performance metric. In such embodiments, the CQI values quantize measured SNR and provide a more compact signalling format, which is desirable for high CQI reporting rates. Of course, CQIs can be based on measures other than an SNR scale. Regardless, higher CQI reporting rates are used in more sophisticated wireless communication networks to drive fast dynamic scheduling and link adaptation, which allows those systems to achieve high bit rates and high system throughput.

Even so, it is known in the art to mitigate an "aging" problem. For example, patent application published as US 2005/0181811 A1 teaches "correcting" CQI feedback from a receiver according to an "offset" value. As this reference explains, a channel-dependent scheduler at a base station schedules the user or users reporting the best channel conditions, but the actual channel qualities for those users may have deteriorated by the time the scheduled transmissions occur. The reference thus looks at additional information that can be used to get a more accurate sense of channel quality. In one embodiment, ACK/NACK feedback from a receiver provides a basis for determining or otherwise updating an offset value that is used to correct CQI feedback from the receiver. In this manner, CQIs reported by the receiver can be adjusted by being increased or reduced by a performance-based offset that is determined by monitoring one or more parameters indicative of reception performance. The approach is useful in that it helps prevent the selection of overly optimistic transmission parameter settings.

Another known mitigation technique applies a similar type of offset to reported CQIs, but bases the offset on CQI age. The published international patent application WO 2006/075208 A1 provides an example of age-based CQI compensation in the HSDPA context, where it is suggested that applying corrective back-off or offset values to all CQIs is less preferable than applying an age-dependent offset, in the sense that a relatively new CQI may well provide an accurate sense of current channel conditions at the reporting receiver. It further teaches applying an offset to reported CQIs, where the magnitude of the applied offset is determined as a function of CQI age.

Neither of the above approaches directly addresses the challenges posed by some of the newer communication network standards, such as Long Term Evolution (LTE). Like HSDPA and other high-rate services, LTE relies on fast link adaptation and dynamic user scheduling to achieve high bit rates and maintain high data throughput. For example, an LTE base station, referred to as an eNodeB, may perform link adaptations on a one millisecond basis. LTE receivers support such operations by generating periodic CQI reports according to measurements taken from common reference symbols received in the downlink. The receivers send CQI reports on a physical uplink control channel (the PUCCH, for example), and also may send CQI reports on a physical uplink shared channel (the PUSCH, for example), responsive to receiving grants from an eNodeB.

Problematically, however, certain modes of operation in LTE can result in significantly extended delays between CQI reports from a given user, as compared to HSDPA, for example. In the current LTE standards, the reporting delays for CQIs may be as short as four milliseconds, and as long as eighty milliseconds. Such variability significantly complicates any approach to CQI correction, as there may not be enough recent feedback for performance-based back-offs. Further, with the wide variability in reporting delays and the potential for very long reporting delays, the known approaches to age-based back-offs may produce overly conservative back-offs, which lowers data throughput below achievable levels and thus wastes link capacity. Published patent application US 2012/039207 A1 teaches that reported channel quality information, as used for controlling one or more aspects of wireless transmission, is compensated according to an aging function that depends on channel variability. In this manner, the "amount" or extent of age-based compensation applied to the channel quality feedback for a given user—e.g., a mobile station or other item of user equipment—varies as a function of that user's channel conditions. More particularly, the aging function applied to the channel quality estimates received from (or generated for) a given user depends on estimates of that user's channel variability. Channel quality estimates for a user whose channel conditions are changing very little, or at least are changing very slowly, may be aged less aggressively than those associated with a user whose channel conditions are changing more rapidly. The uplink feedback for support of downlink data transmission comprises the RI, the PMI, and the CQI. The CSI reporting is an important feature to report the channel status from UE to network in order to enable the link adaptation with radio resource scheduling to optimize the system capacity. The physical channels that may be used for the uplink feedback signalling are Physical Uplink Control Channel (PUCCH) and Physical Uplink Shared Channel (PUSCH).

Lack of unified approach for applying link adaptation in different UEs may degrade overall system performance, i.e. sub-optimizing overall throughput in the communication system. It is therefore a desire to provide approaches for limiting such sub-optimization.

SUMMARY

The invention is based on the understanding that only restricting link adaptation is not the best solution for improving overall throughput, wherein the inventors have realized that information exchange and interaction between the UEs and the base station or other network nodes of the communication system could provide for a better solution.

According to a first aspect, there is provided a method of an electronic communication device arranged to operate in a radio communication system, wherein the radio communication system has capability of performing link adaptation by adapting one or more parameters of communication in view of a quality of a radio link between a network node of the radio communication system and the electronic communication device. The method comprises determining a link adaptation status for the electronic communication device, and transmitting information related to the determined link adaptation status to one or more network nodes of the radio communication system.

The link adaptation status may include information whether link adaptation is applied for the electronic communication device. The information whether link adaptation is applied for the electronic communication device may be derived from signalling from a network node of the radio communication system to the electronic communication device, wherein the signalling comprises an indication whether link adaptation is allowed for the electronic communication device. The information whether link adaptation is applied for the electronic communication device may be derived from determination whether targeted block error rate of communication deviates between the electronic communication device and a serving network node of the radio communication system and deviates from a predetermined default targeted block error rate, wherein no deviation calls for no link adaptation. The information whether link adaptation is applied for the electronic communication device may be derived from one or more predefined communication scenario or condition.

The link adaptation may include an outer loop link adaptation and the link adaptation status may include information about targeted block error rate used in link adaptation at the electronic communication device. The method may comprise estimating a maximum Doppler shift of signals on a physical channel between a serving network node of the radio communication system and the electronic communication device, and determining the targeted block error rate taking into account the estimated maximum Doppler shift. The method may comprise applying an automatic repeat request approach for communication between a serving network node of the radio communication system and the electronic communication device, calculating a real time of block error rate determination of first attempt for transmissions of the automatic repeat request approach at a data decoder of the electronic communication device, and determining the targeted block error rate taking into account the real time calculation. The method may comprise estimating channel correlation among receive antenna ports, and determining the targeted block error rate taking into account the estimated channel correlation. The determining of the targeted block error rate may include taking into account one or more predefined communication scenario or condition.

The link adaptation may include an outer loop link adaptation and the link adaptation status may include information about outer loop link adaptation adjustment. The information about outer loop link adaptation adjustment may comprise information about one or more elements used for link adaptation adjustments. The one or more elements may reflect channel status. The information about outer loop link adaptation adjustment may comprise a step size used for the outer loop link adaptation. The method may comprise applying an automatic repeat request approach for communication between a serving network node of the radio communication system and the electronic communication device, and calculating a real time of block error rate determination of first attempt for transmissions of the automatic repeat request approach at a data decoder of the electronic communication device, wherein the information about outer loop link adaptation adjustment may comprise the calculated real time based on the one or more elements and the step size used for the outer loop link adaptation based on acknowledgements and non-acknowledgements of an automatic repeat request approach. The information about outer loop link adaptation adjustment may be determined from a look-up table comprising one or more of targeted block error rate, information about communication scenario or condition, step size used for the outer loop link adaptation based on acknowledgements and non-acknowledgements of an automatic repeat request approach, adjusted time limit of time of block error rate of first attempt for transmissions of the automatic repeat request approach, propagation channel, channel correlation and information related to an estimated maximum Doppler shift of signals on a physical channel between a serving network node of the radio communication system and the electronic communication device.

The method may comprise receiving a request from a network node of the radio communication system, wherein determining a link adaptation status and the transmitting of information related to the determined link adaptation status to one or more network nodes of the radio communication system are performed upon the request.

Optionally, the electronic device only transmits the information related to the determined link adaptation status if there is a change in the determined link adaptation status. The transmitting may be performed in a higher layer signalling, wherein higher layer is above physical link layer.

According to a second aspect, there is provided a method of a network node of a radio communication system, wherein the radio communication system has capability of performing link adaptation by adapting one or more parameters of communication in view of a quality of a radio link between the network node of the radio communication system and an electronic communication device arranged to operate in the radio communication system. The method comprises receiving, from the electronic communication device, a link adaptation status for the electronic communication device, and adapting link adaptation operations based on the received link adaptation status.

The adapting of the link adaptation operations may include selecting modulation and coding scheme.

The adapting of the link adaptation operations may include adjusting an outer loop link adaptation from decoding performance such that expected channel quality is corrected with a back-off value towards a predefined block error rate target.

The adapting of the link adaptation operations may include adapting resource allocation for communication resources allocated to a link with the electronic communication device.

The adapting of the link adaptation operations may include adapting scheduling for the communication with the electronic communication device. The adapting of scheduling may comprise adapting package size for communication of a link with the electronic communication device.

The method may comprise transmitting information to another network node of the radio communication system about the received link adaptation status.

The method may comprise transmitting a request to the electronic communication device to determine the link adaptation status.

The method may comprise determining whether it is allowed for the electronic communication device to perform link adaptation, and transmitting signalling to the electronic communication device, wherein the signalling comprises an indication whether link adaptation is allowed for the electronic communication device.

According to a third aspect, there is provided a computer program comprising instructions which, when executed on a processor of an electronic communication apparatus, causes the electronic communication apparatus to perform the method according to the first aspect.

According to a fourth aspect, there is provided a computer program comprising instructions which, when executed on a processor of a network node, causes the network node to perform the method according to the second aspect.

According to a fifth aspect, there is provided an electronic communication device arranged to operate in a radio communication system, wherein the radio communication system has capability of performing link adaptation by adapting one or more parameters of communication in view of a quality of a radio link between a network node of the radio communication system and the electronic communication device. The electronic communication device is arranged to perform the method according to the first aspect.

According to a sixth aspect, there is provided a network node of a radio communication system, wherein the radio communication system has capability of performing link adaptation by adapting one or more parameters of communication in view of a quality of a radio link between the network node of the radio communication system and an electronic communication device arranged to operate in the radio communication system. The network node is arranged to perform the method of the second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

The CQI indicates the combination of the maximum information data size and the modulation scheme among QPSK, 16QAM, 64QAM and 256QAM, which can provide block error rate not exceeding 0.1 assuming that the reported rank, RI, and the reported precoding matrix, PMI, are applied in the time-frequency resource. The PMI is calculated conditioned on the associated RI, and the CQI is calculated conditioned on the associated RI and PMI. For RI=1, only one CQI is reported for each reporting unit in frequency, which could be either wideband or sub-band in the case of frequency-selective report. For RI>1, for closed-loop spatial multiplexing one CQI is reported for each codeword as different codewords experience different layers, while for the open-loop spatial multiplexing, only one CQI is reported as each codeword experiences all layers.

The PMI indicates the preferred precoding candidate for the corresponding frequency unit, for example, a particular sub-band or the whole frequency bandwidth, and is selected from the possible precoding candidates according to the RI. The PMI is only reported for closed-loop spatial multiplexing. The RI indicates the number of layers, which can be accommodated by the current spatial channel experienced at the UE.

The following are the definitions of CQI and CSI reference resource defined in 3GPP TS 36.213, v. 12.5.0, section 7.2.3:

Based on an unrestricted observation interval in time and frequency, the UE shall derive for each CQI value reported in uplink subframe n the highest CQI index between 1 and 15 which satisfies the following condition or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

With this definition of CQI, PMI, and RI, the UE can report the maximum data size that it can receive and demodulate, taking into account its receiver ability. With the current definition of CQI the targeted BLER from UE side should be 10% as indicated above.

Estimating the CSI from UE side is a delicate task, comprising a number of computational steps, each considering a large number of factors. The transport format selection process at the transmitter is very sensitive to CQI estimation errors. Accordingly, a targeted Block Error Rate (BLER) as 10% might be difficult to achieve with poor CQI estimation.

CQI estimation may involve a suggested selection, based on instantaneous channel conditions, of the modulation and coding rate and transport block size that the receiver can support with a given BLER. For MIMO systems, the suggested selection may also include the number of transmitted streams and the optimal precoding matrix.

In practice, a number of factors may add to the CQI estimation errors. One error source is the delay between the measurement of CQI and the time the actual transmission takes place. During this period, the channel and interference may change significantly.

Another source of error is channel and noise/interference estimation errors. Channel estimation quality depends on the SNR, delay and Doppler spread, and the power allocated to reference symbols. Channel estimation errors affect not only the SNR calculation for CQI, but also the demodulation performance, and in a way that could be difficult to model. Interference estimation should thus ideally be based on measurements on data channels, and not reference symbols.

The LTE system has the HARQ retransmission mechanism to ensure a robustness of transmission both in uplink (UL) and downlink (DL). The turbo decoder with cyclic redundancy check (CRC) applied could provide a mechanism to have self-checking after decoding with the knowledge of the current codeword/transport block is decoded correctly or not and then provide an acknowledgement (ACK) or non-acknowledgement (NACK) as a feedback to request for retransmission or not. With such ACK/NACK feedback from UE side the base station (BS) could acknowledge of the successful codeword/transport block or the failed one with the need to be retransmitted. The ACK/NACK feedback could also be used in the scheduler in BS for a better link adaptation with the possibility to adjust further the selected maximum data size transmitted from BS, referred as Outer Loop Link Adaption (OLLA) from eNodeB side, with more details explained below.

Link adaptation (LA) is a term used in radio communication network with the ability to adapt the modulation scheme and the coding rate of the error correction according to the quality of the radio link. In LTE the standardized adaptation is based on the reported CSI from the UE. If the conditions of the radio link are good, a high-level efficient modulation scheme and a small amount of error correction bits are used. This gives a high data throughput on the radio channel. If the conditions of the radio channel are poor, a low-level, i.e. more robust, modulation scheme is used and the amounts of error correction bits are increased. The data throughput will thus drop.

Furthermore, for time-variant communication channels, the delay between channel estimation or prediction and the adaptation of the link induces additional inaccuracies in the CQI estimation. Therefore, it is common practice to obtain a back-off value and modify an estimated CQI using the back-off value, either at the receiver or at the transmitter or on both sides. Using a back-off value to modify a CQI value may increase the level of error protection compared to the originally computed CQI, but it may also decrease the level of error protection. For example, if the CQI is in the form that corresponds to a modulation and coding scheme, the back-off may decrease the code-rate of the coding scheme, thereby increasing the level of error protection, compared to the originally computed modulation and coding scheme. The back-off value affects a computed CQI so that a larger back-off yields a higher level of error protection, and a smaller back-off yields a lower level of error protection. The computed CQI may be quantized so that a range of back-off values yields the same level of error protection. Note that the back-off value may be applied to any step in the computation of the CQI, not necessarily the final result. For example, if the CQI corresponds to a modulation and coding scheme, which is selected based on the computation of one or many Signal-to-Interference-and-Noise Ratios (SINRs), the back-off value may be applied to the one or many SINRs.

In a system with link adaptation and a target BLER, the back-off value may be adaptively adjusted over time in order to meet the target. One example implementation of such an adaptive back-off is that the receiver continuously estimates the BLER and changes the back-off with a term proportional to the difference between the estimated BLER and the target BLER. Another example implementation is that the back-off value is increased or decreased depending on whether the latest block was correctly received. By proper assignment of the increase step-size and the decrease step-size, the target BLER can be approximately met. Note that a back-off value may also be used in a system where the channel quality can be directly estimated at the transmitter.

The main purpose of outer loop link adaptation is to keep the BLER at a given level by adjusting the adaptation thresholds dynamically, although the applying of a specific offset depending on the channel status or the codeword successful rate, etc.

The link adaptation based on more than measurements from current subframe can also be applied from UE side, which is taken as an advanced CQI reporting method with the possibility to adapt reported CQI. For example such advanced CQI reporting can be by taking ACK/NACK feedback into account of the reported CQI, similar as Outer Loop Link Adaption (OLLA) from eNodeB side but with the difference on impact of changing the reported CQI, as indicated in discussion document of meeting #75 of 3GPP TSG-RAN WG4 denoted R4-152894 and published patent application US 2009/0238086 A1. This type of link adaptation can be referred as OLLA from UE side. This type of UE behaviour is against definitions from the LTE specification and unknown from network side. If different UEs with different conditions applied with different link adaptation capability, e.g. with different targeted BLER or with different step sizes, while network is without any knowledge of it, the network would still assume that all the UL feedback of the channel status reported by the UE are still based on the actual channel condition without any adjustment with targeted BLER as 10%. Hence the network operation will not operate in optimized way from a system level point of view.

Further, such handling of reported CQI based on ACK/NACK in the UE will counteract the OLLA applied in eNodeB, which will bring uncertainty to network with possible negative impact. There is no test to detect or restrict such UE implementations in 3GPP TS 36.101, v. 12.7.0. This disclosure suggests approaches for avoiding sub-optimization of network performance. A UE determines link adaptation status based on knowledge the UE may be in possession of, e.g. by measurements or by knowledge of its operation, and provides information about that to the network. The network, by one or more network nodes, may thus gain knowledge about the link adaptation status of respective UE and adapt link adaptation operations accordingly, e.g. by deciding and signalling to the UE whether link adaptation should be allowed for the UE, adapting communication parameters, etc. This interaction between the network and the UE may improve overall throughput for the communication system. One or more of the embodiments demonstrated herein provides for one or more of the following effects:

- The UE behaviour may be unified and known to the network node.
- The network node may utilize radio resources more efficiently while taking into consideration the link adaptation information with reported CSI from one or more UEs.
- The system performance may be optimized with a common/known targeted BLER.
- The network node may also stop the UE applying any type of link adaptation in order to avoid conflicts and/or sub-optimization.

From the UE side, the approach comprises, in brief, determining link adaptation status, e.g. for outer loop link adaptation, for the UE based on one or more parameters or criteria that the UE is in possession of. The UE is arranged to transmit information about the link adaptation status to a network node, e.g. to or via the base station serving the UE. The time of the transmission may be determined in different ways, e.g. upon request from the network node, upon change of link adaptation status, etc.

From the network side, the approach comprises receiving the information about the link adaptation status for a UE and adapting link adaptation operations based on the information. The adapting of the link adaptation operations aims for overall improved throughput of the communication system. The adapting of the link adaptation operations may comprise adapting obtained CSI, adapting link adaptation with MCS, PMI, RI, etc., adapting resource allocation scheduling, etc. The adapting may include interaction with other network nodes. The network node may transmit a request for information, e.g. from or via the base station, about the UE's link adaptation status, the information may be provided on initiative from the UE, the information may be provided according to a schedule or on regular basis, etc.

Figure 1:
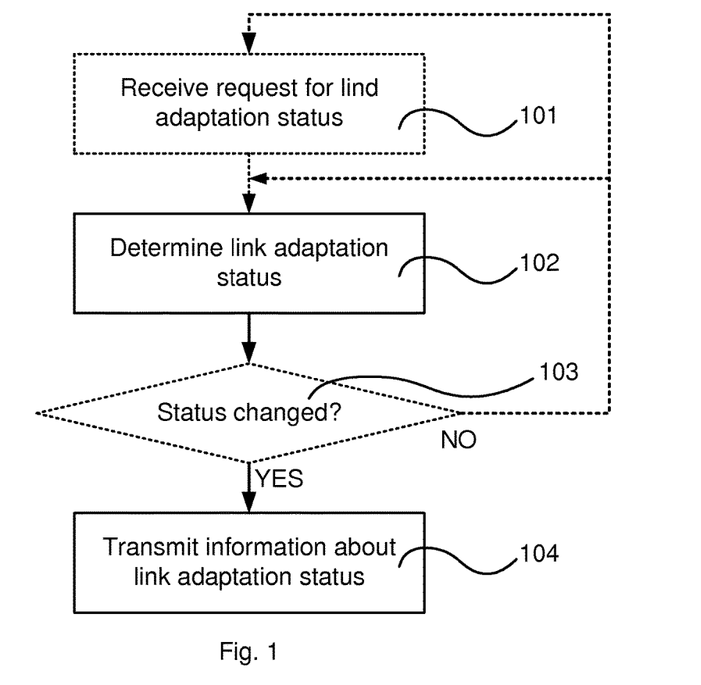
FIG. 1 is a flow chart illustrating methods of an electronic communication device according to embodiments.

FIG. 1 is a flow chart illustrating methods of an electronic communication device, e.g. a UE, according to embodiments.

A basic embodiment includes that the electronic communication device determines 102 link adaptation status. The determination may be performed in different ways as demonstrated below. For example, one state may be that no link adaptation is applied at the electronic communication device. When the determination 102 is made, information about the link adaptation status is transmitted 104 to one or more network nodes of the radio communication system, e.g. to or via a serving network node.

According to one embodiment, the electronic communication device receives 101 a request from a network node, e.g. from or via the serving network node, to perform the determination 102 of link adaptation status. Upon such request, the operations according to the basic embodiment demonstrated above are performed.

According to one embodiment, the electronic communication device determines 102 the link adaptation status. The electronic communication device then determines 103 whether there has been any change in link adaptation status, e.g. by comparing with a stored status value from a previous determination. If no change in link adaptation status is determined 103, the electronic communication device does not transmit any status report to the network, or transmits an indication about no change, and returns to be able to perform the method again. This may be either by returning to step 101 and wait for a request to perform determination or by returning to step 102 to perform the determination 102 on a regular basis or according to a schedule for the determination.

Figure 2:
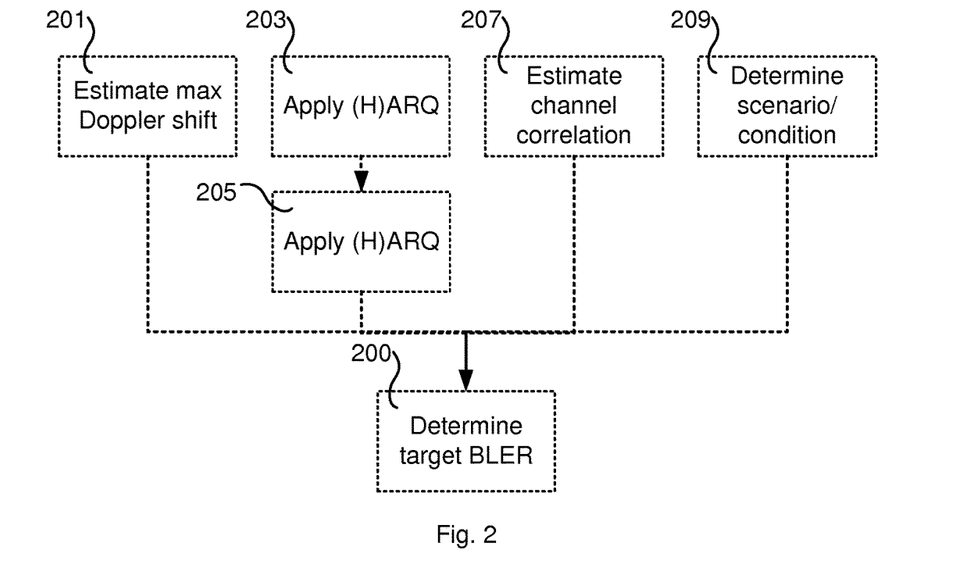
FIG. 2 is a flow chart illustrating a method according to an embodiment.

The link adaptation status may comprise for example information whether link adaptation is applied at all at the electronic communication device. If no link adaptation is performed, this is information enough for the network to take into consideration for its operations, e.g. to instruct the electronic communication device that it is allowed to perform link adaptation if that is considered to improve throughput. If link adaptation is applied, e.g. outer loop link adaptation, at the electronic communication device, the status may comprise one or more of targeted block error rate (BLER) used in the link adaptation at the electronic communication device. FIG. 2 is a flow chart illustrating determination 200 of target BLER according to embodiments. One option is to estimate 201 a maximum Doppler shift for a physical channel between the serving network node and the electronic communication device. The estimated maximum Doppler shift is then included in the determination 200 of the target BLER. When an automatic repeat request (ARQ), e.g. hybrid ARQ (HARD), is applied 203, one option is to calculate 205 BLER determination time, i.e. the time window within which BLER is determined for first attempt transmissions of the ARQ, wherein this time is included in the target BLER determination 200. This may be considered as a filter size for a filter used for the BLER determination. This option may be combined with the previously demonstrated option, wherein the target BLER is determined 200 from both the estimated maximum Doppler shift and the BLER determination time. One option is to estimate 207 channel correlation among receiver antenna ports and possibly compare the estimate(s) with one or more thresholds to set one or more levels of the channel correlations, e.g. low, medium and high correlation. The information about the channel correlations is then included in the determination 200 of the target BLER. This option may be combined with the previously demonstrated option, wherein the target BLER is determined 200 from both the channel correlations and the estimated maximum Doppler shift and/or the BLER determination time. One option is to determine 209 a scenario and/or condition associated with the communication. Examples thereof will be given below. The information about the scenario/condition is then included in the determination 200 of the target BLER. This option may be combined with the previously demonstrated option, wherein the target BLER is determined 200 from both the information about the scenario/condition and one or more of channel correlations, the estimated maximum Doppler shift and the BLER determination time.

As discussed above, a part of the link adaptation status determination, denoted with reference No 102 in FIG. 1, may be to determine if link adaptation is performed at all at the electronic communication device. This is of course linked to a decision or controlling made at the electronic communication device about performing link adaptation. For example, the electronic communication device may have received signalling information from the network side whether it is allowed to apply link adaptation. If the signalling information indicates that no link adaptation is allowed, the link adaptation status readily should be that no link adaptation is applied. If the signalling information indicates that link adaptation is allowed, the link adaptation may depend on a decision taken by the electronic communication device about the topic. For example, the electronic communication device may decide based on a determination whether target BLERs of the electronic communication device and the serving network node deviates from a predetermined default target BLER, or from each other. Consider for example a case where both the target BLER of the electronic communication device and the target BLER of the serving network node agree with the predetermined default target BLER, e.g. 10%. In such case, there is no considerable reason for link adaptation, and the decision is to not apply link adaptation. If there is any deviation on the other hand, especially when it is considerable, there may be benefits of applying link adaptation and a decision may be made accordingly. The determination of the target BLER of the electronic communication device may be made as demonstrated above with reference to FIG. 2. Other reasons for deciding on whether to apply link adaptation may include taking some communication scenario, which may be predefined as given in examples below, or some communication condition into account. Thus, the determination of whether link adaptation is applied may be taken on any record of such decisions, or may be taken on parameters for such decisions, as demonstrated above.

As mentioned above, the link adaptation may be based on an outer loop link adaptation (OLLA) adjustment. Examples on information used for the adjustment are channel status, e.g. estimated channel, mutual information, symbol information, Shannon capacity, channel power, SINR, CQI, PMI, RI, etc., step size used for OLLA based on ACK/NACK adjustment, time, e.g. filter size for BLER determination, filter information, e.g. type of filter for the BLER determination, propagation channel, channel correlation among receive antennas, and other conditions for the channel.

Here, the step size, which may be adjusted based on transmitted ACK/NACK signals, defines how much an adapted parameter for the link adaption should be adjusted. For example, consider a step size for a NACK of 1 dB down is applied and a step size of 0.11 dB up for an ACK, wherein 9 subframes with ACK and 1 with NACK, i.e. BLER of 10%, would form some kind of equilibrium. Other step sizes may be chosen which would form adaptation to a target BLER, e.g. 0.5 dB down for NACK and 0.125 dB up for ACK gives equilibrium at 20% BLER, etc. The offset range may be chosen to be within for example −20 dB and 20 dB, i.e. accumulated steps are not allowed to go outside the range and such limitation may be predefined in the system so it's known from the network node and the UE sides. There may also be chosen an initial offset in OLLA, i.e. a non-zero initial offset. The initial offset may for example be chosen to be 0.5 dB. The values given in the examples above should readily be chosen for features of the used receiver, e.g. depending on capability of interference mitigation, and the context in which it is used. The adjustment using the step size may be applied to the channel status parameters demonstrated above.

The link adaptation adjustment may include calculation and adjustment of time for determining BLER. The adjustment may also include other filter parameters for a filter used for the determination. This may depend on how well the channel can be estimated and tracked. A lower variance of the estimation is of course better. For lowering the variance, filtering may be adapted. For example may a highly correlated channel, i.e. slowly varying, benefit from a large size filter, i.e. a long time considered for determination, while a faster varying channel would benefit from a smaller filter. Similar applies for slowly varying interference versus bursty interference.

As may be understood from the disclosure above, a multitude of parameters and states may be considered for applying (or deciding not to apply) link adaptation at the electronic communication device. One way of dealing with all this information is to form some scenarios each including a parameter set, which parameter set comprises both parameters to compare with determined or estimated values, for identifying a suitable scenario which best fits the actual situation, and parameters to choose for suitable link adaptation. Table 1 illustrates an example of a set of scenarios. The example should mainly be construed to illustrate the concept of forming scenarios and the values should not be taken as the only applicable or be limiting, although they are chosen to give a fair view of a practical implementation. The table may also be considered as a structure for forming a look-up table for selection of link adaptation parameters. The notations of propagation channel states in Table 1 follow the 3GPP notations of Extended Pedestrian A model (EPA), Extended Typical Urban model (ETU), and Extended Vehicular A model (EVA).

the electronic device is applying link adaptation or not would only require a single bit of information. Similar, the indication whether a change in status has occurred or not would only require one bit of information. The electronic device may also indicate whether it has capability of applying link adaptation. Reported information about target BLER used in link adaptation at the electronic communication device may be given as an index of a system predefined BLER table which is in possession of any network node of the communication system. One example is that the targeted BLER is a static number indicating that the link adaptation is always targeted at a fixed BLER. Another example is a real time feedback in uplink channels indicating a variable target BLER applied in the electronic communication device during a reporting period. Information about outer loop link adaptation adjustments may for example include an index related to the element used for the adjustment. According to another example, a scenario table also known by the network node may be used and the electronic device is communicating the index of the scenario applied for link adaptation, wherein the network node gains the combined information from the scenario table reflecting the link adaptation status applied by the electronic communication device.

As discussed above, the UE may report the the information proactively or autonomously whenever the UE determines any change in the link adaptation status, or periodically or whenever the UE sends uplink feedback information, e.g. HARQ feedback, measurement report, etc. Alternatively or additionally, the UE may report the information upon receiving a request from a network node to transmit the information related to the link adaptation status. The UE may be requested by the network node to report the information only if there is any change in link adaptation status.

The UE may report the information by using any of the following mechanisms:

In a first type of reporting mechanism, the first UE may transmit the information in a higher layer signaling such as via a Radio Resource Control (RRC) message to the network node. Such information may also be reported in a Medium Access Control (MAC) message.

In a second type of reporting mechanism, the UE may also use the unused bits, code words, fields, control space, bit pattern, bit combinations, etc., i.e. spared, reserved, redundant bits, code words, control space, bit pattern, bit combinations, etc., for indicating the information

TABLE 1

| Targeted BLER for first data transmission | Scenario Index | Adjusted element | Step size | Adjusted time unit | Propagation channel | Channel correlation | Speed/Max Doppler |
|---|---|---|---|---|---|---|---|
| 10% | 1 | CQI | ACK 0.1 NACK 1 | 1 ms | EPA | Low | 3 km/h |
| 20% | 2 | CQI | ACK 0.2 NACK 1 | 1 ms | EPA | Low | 30 km/h |
| 20% | 3 | CQI | ACK 0.2 NACK 1 | 10 ms | ETU | Medium | 30 km/h |
| 50% | 4 | CQI | ACK 0.5 NACK 1 | 20 ms | EVA | Low | 120 km/h |
| 80% | 5 | CQI | ACK 0.8 NACK 1 | 100 ms | EVA | Low | 300 km/h |

Returning to FIG. 1, for the transmitting 104 of link adaptation status to the network side, i.e. to the serving network node or via the serving network node to another network node, e.g. a controlling node, the reporting whether related to the link adaptation to the network node. Typically, the UE sends the determined information to the serving base station using this mechanism. The unused bits herein means any set of available bits in an uplink control channel that are not used for indicating the UE about any of uplink transmission parameters, e.g. are not used for indicating uplink feedback information such as CSI related information or combined with uplink data and sent by uplink data channel.

The information reported by the UE to the network node may be considered valid by any network nodes for certain time period or time unit. Examples of time unit are subframe, Transmission Time Interval (TTI), time slot, frames etc. This may be determined based on one or more pre-defined rule and/or an indication from the UE. Examples of such rules or indications for determining the validity of the said information are:

Information is valid only during a time unit, e.g. subframe, TTI, time slot, frames etc., in which the information is received at the network node;

Last received information remains valid until the reception of the new information at the network node;

Information is valid for L number of time units, e.g. subframes, TTIs, time slots, frames etc., starting from a reference time, T, where T can be time when the information is received, a reference time unit, e.g. Subframe number (SFN)=0, etc.

Information received in a certain time unit, e.g. subframe n, is valid or applicable until subframe n+m, where m is an integer value of 1 or more.

Figure 3:
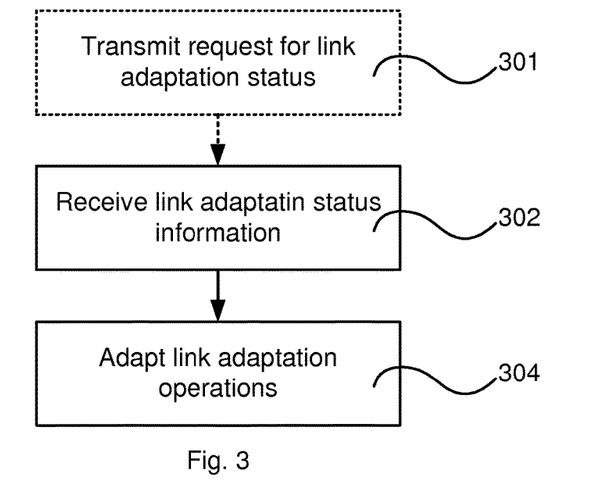
FIG. 3 is a flow chart illustrating methods of a network node according to embodiments.

FIG. 3 is a flow chart illustrating methods of a network node of the communication system. The network node receives 302 link adaptation status information from a UE. The information may be received by a serving network node or be received via the serving network node. The received information is used for adapting 304 link adaptation operations. The adapting 304 of link adaptation operations may include adapting link adaptation, adapting obtained CSI, adapting outer loop parameters, and/or adapting resource allocation scheduling. The network node may also transmit the information to other network nodes for their adaptation. Optionally, the network node may transmit 301 a request to the UE for the link adaptation status, wherein the UE may report as demonstrated above.

For example, the adapting of the link adaptation operations may include selecting a modulation and coding scheme (MCS) based on the received information. This may be made based on reported targeted BLER. For the selection, a pre-calculated look-up table may be used.

Another example is regarding outer loop adaptation. The network node may base a decision on one or more criteria whether the link adaptation status reported by the UE is accurate, and then adjust the outer loop link adaptation accordingly. For example, decoding performance may be monitored, e.g. HARQ feedback, and an expected channel quality with a back-off towards a pre-defined BLER target may be corrected accordingly. One example is to get a step size, as demonstrated above, from a latest adjustment and subtract the back-off to achieve a conflict-free adaptation.

Still another example is to adapt resource allocation. The network node may schedule the same length of resource in time domain to the UE under some condition as the reported adjusted time unit used by the UE, wherein it may be beneficial to use the same fixed reference channel (FRC), precoder, rank, etc. within the same resource unit.

Still another example is to adapt scheduling. Lower throughput may be the result of higher targeted BLER when using large package size. The network node may then schedule smaller package size to balance system throughput.

The aim of the interaction between the network node and the UE is to avoid sub-optimization and provide a better overall throughput of the communication system. For enabling this not to be only a local improvement, interaction between network nodes may also be provided. The network node that has obtained the link adaptation status may send the information to another network node, e.g. the serving network node may send the information to a radio network control (RNC) network node over an Iub interface, and/or to a neighbouring base station over an X2 interface, etc. Depending on the architecture of the communication network, the information sharing interfaces and the type of network nodes may be different, as is readily understood by one skilled in the particular communication network type. The network nodes receiving the information may use it for one or more radio control tasks. For example, the RNC may adapt or modify link adaptation control of one or more UEs using the information.

One way of adapting link adaptation operations is to determine whether one or more UEs should be allowed to apply link adaptation and control them accordingly. The determination may be based on for example package size, load of the cell, a present communication scenario, etc. For example, if the network node is required to use large package size and low target BLER, e.g. the higher or highest transport block size (TBS) and target BLER of for example 10% or lower, but the targeted BLER applied at the UE is higher, there may be a conflict resulting in lower overall throughput, the network node may forbid the UE to apply link adaptation. Another example is at low load of the cell when a low targeted BLER may be beneficial, but the UE intends to apply a higher target BLER in its link adaptation. In such case the network node may also forbid the UE to apply link adaptation. Still another example is at a low speed scenario, i.e. the estimated maximum Doppler shift is low, a lower target BLER may be considered beneficial by the network node, but the UE intends to apply a higher target BLER in its link adaptation. Also in such case the network node may also forbid the UE to apply link adaptation. Other examples may be considered where there are conflicting BLER targets or other link adaptation parameters should be readily understood from this disclosure.

The network node may thus provide control information to the one or more UEs whether they are allowed to apply link adaptation.

Figure 4:
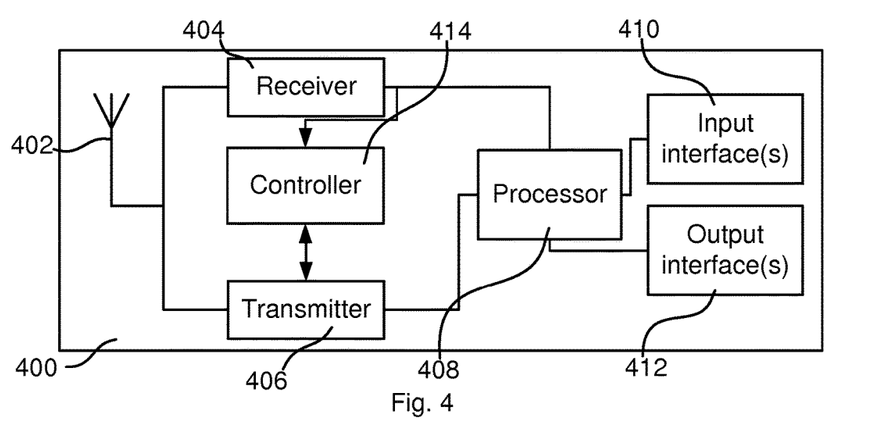
FIG. 4 is a block diagram schematically illustrating an electronic communication device according to an embodiment.

FIG. 4 is a block diagram schematically illustrating an electronic communication device, e.g. a UE, 400 according to an embodiment. The electronic communication device 400 comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The electronic communication device 400 is arranged to operate in a cellular communication network. In particular, by the processing element 408 being arranged to perform the embodiments demonstrated with reference to FIGS. 1 and/or 2, the electronic communication device 400 is capable of link adaptation. The processing element 408 can also fulfill a multitude of tasks, ranging from signal processing to enable reception and transmission since it is connected to the receiver 404 and transmitter 406, executing applications, controlling the interfaces 410, 412, etc.

Figure 5:
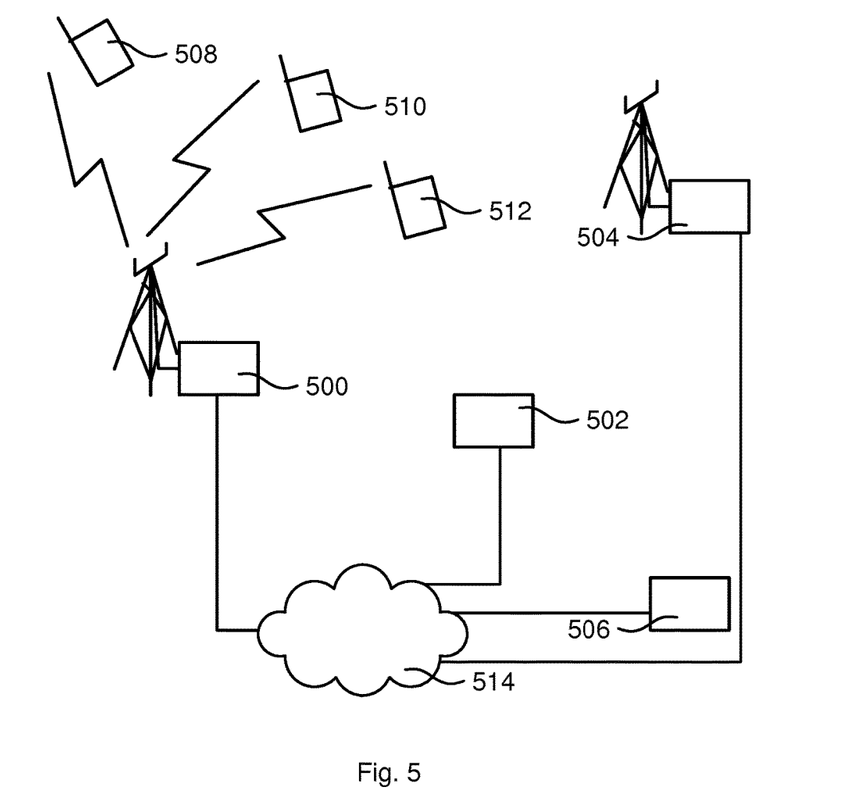
FIG. 5 illustrates a part of a communication system.

FIG. 5 is a block diagram illustrating a part of a communication network including network nodes 500, 502, 504, 506 and UEs 508, 510, 512. Network node 500 is a serving network node, e.g. an eNodeB, for the UEs 508, 510, 512.

Network node 502 is a network node, e.g. a radio network controller (RNC) or a core network node associated with the network node 500. Network node 504 is a neighbouring eNodeB to the serving network node 500. Network node 506 is a further network node, e.g. a further RNC or core network node associated with the network node 504 or associated with another non-shown radio access network node. Since interfaces between the network nodes 500, 502, 504, 506 may be different depending on the network type and its architecture, the interconnection between the network nodes is generalized by interface entity 514. As demonstrated above, the link adaptation status is acquired by or via the serving network node 500. Thus, the receiving network node may for example be the network node 502. As also demonstrated above, the network node 500, 502 that has acquired the link adaptation status may forward the information to other network nodes 504, 506.

Figure 6:
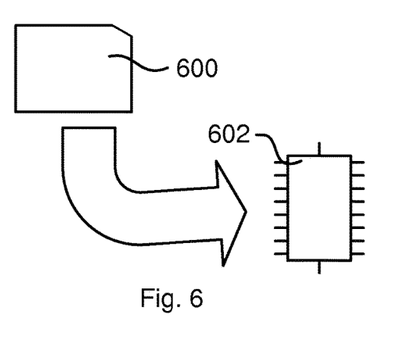
FIG. 6 schematically illustrates a computer-readable medium and a processing device for a computer program for an electronic communication device.

The methods for the electronic communication device as demonstrated above are suitable for implementation with aid of processing means, such as computers and/or processors, especially for the case where the processing element 408 demonstrated above comprises a processor handling link adaptation or the determinations about the link adaptation status in an electronic communication device as demonstrated above. Therefore, there is provided computer programs, comprising instructions arranged to cause the processing means, processor, or computer to perform the steps of any of the methods according to any of the embodiments described with reference to FIG. 1 or 2. The computer programs preferably comprises program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIG. 1 or 2. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

Figure 7:
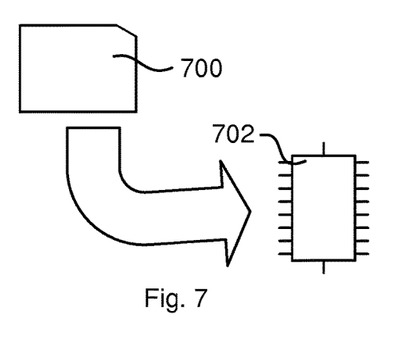
FIG. 7 schematically illustrates a computer-readable medium and a processing device for a computer program for a network node.

The methods of the network node as demonstrated above are suitable for implementation with aid of processing means, such as computers and/or processors, especially for the case where a processing element of a network node comprises a processor handling the processing of acquired link adaptation status from UEs and the determination of providing control of the UEs' link adaptation. Therefore, there is provided computer programs, comprising instructions arranged to cause the processing means, processor, or computer to perform the steps of any of the methods according to any of the embodiments described with reference to FIG. 3. The computer programs preferably comprises program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to FIG. 3. The computer 702 and computer program product 700 can be arranged to execute the program code sequentially where actions of the any of the methods are performed stepwise. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

The invention claimed is:

1. A method of a network node of a radio communication system, wherein the radio communication system has capability of performing link adaptation by adapting one or more parameters of communication in view of a quality of a radio link between the network node of the radio communication system and an electronic communication device arranged to operate in the radio communication system, the method comprising:

determining whether it is allowed or forbidden for the electronic communication device to perform link adaptation, wherein it is determined that link adaptation is forbidden for the electronic communication device when the network node determines that the electronic communication device will perform a link adaptation that will result in a conflict between one or more link adaptation parameter targets of the network node and one or more link adaptation parameter targets of the electronic communication device; and transmitting signalling to the electronic communication device, wherein the signalling comprises an indication whether link adaptation is allowed or forbidden for the electronic communication device, wherein the indication from the network node that link adaptation is forbidden instructs the electronic communication device to readily cause no link adaption to be applied;

receiving, from the electronic communication device, a link adaptation status for the electronic communication device; and adapting link adaptation operations based on the received link adaptation status.

2. The method of claim 1, wherein the adapting of the link adaptation operations includes selecting modulation and coding scheme.

3. The method of claim 1, wherein the adapting of the link adaptation operations includes adjusting an outer loop link adaptation from decoding performance such that expected channel quality is corrected with a back-off value towards a predefined block error rate target.

4. The method of claim 1, wherein the adapting of the link adaptation operations includes adapting resource allocation for communication resources allocated to a link with the electronic communication device.

5. The method of claim 1, wherein the adapting of the link adaptation operations includes adapting scheduling for the communication with the electronic communication device.

6. The method of claim 5, wherein the adapting of scheduling comprises adapting package size for communication of a link with the electronic communication device.

7. The method of claim 1, comprising transmitting information to another network node of the radio communication system about the received link adaptation status.

8. The method of claim 1, comprising transmitting a request to the electronic communication device to determine the link adaptation status.

9. A non-transitory computer readable storage medium comprising instructions which, when executed on a processor of a network node of a radio communication system, causes the network node to perform a method, wherein the radio communication system has capability of performing link adaptation by adapting one or more parameters of communication in view of a quality of a radio link between the network node of the radio communication system and an electronic communication device arranged to operate in the radio communication system, the method comprising:
- determining whether it is allowed or forbidden for the electronic communication device to perform link adaptation, wherein it is determined that link adaptation is forbidden for the electronic communication device when the network node determines that the electronic communication device will perform a link adaptation that will result in a conflict between one or more link adaptation parameter targets of the network node and one or more link adaptation parameter targets of the electronic communication device; and
- transmitting signalling to the electronic communication device, wherein the signalling comprises an indication whether link adaptation is allowed or forbidden for the electronic communication device, wherein the indication from the network node that link adaptation is forbidden instructs the electronic communication device to readily cause no link adaption to be applied;
- receiving, from the electronic communication device, a link adaptation status for the electronic communication device; and
- adapting link adaptation operations based on the received link adaptation status.

10. A network node of a radio communication system, wherein the radio communication system has capability of performing link adaptation by adapting one or more parameters of communication in view of a quality of a radio link between the network node of the radio communication system and an electronic communication device arranged to operate in the radio communication system, wherein the network node is arranged to perform a comprising:
- determining whether it is allowed or forbidden for the electronic communication device to perform link adaptation, wherein it is determined that link adaptation is forbidden for the electronic communication device when the network node determines that the electronic communication device will perform a link adaptation that will result in a conflict between one or more link adaptation parameter targets of the network node and one or more link adaptation parameter targets of the electronic communication device; and
- transmitting signalling to the electronic communication device, wherein the signalling comprises an indication whether link adaptation is allowed or forbidden for the electronic communication device, wherein the indication from the network node that link adaptation is forbidden instructs the electronic communication device to readily cause no link adaption to be applied;
- receiving, from the electronic communication device, a link adaptation status for the electronic communication device; and
- adapting link adaptation operations based on the received link adaptation status.

* * * * *